(12) United States Patent
Hamill et al.

(10) Patent No.: US 8,253,732 B2
(45) Date of Patent: Aug. 28, 2012

(54) METHOD AND SYSTEM FOR REMOTE VISUALIZATION CLIENT ACCELERATION

(75) Inventors: John Hamill, Dublin (IE); Mark Levins, Dublin (IE); Davide Pasetto, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 12/341,183

(22) Filed: Dec. 22, 2008

(65) Prior Publication Data

US 2010/0001995 A1 Jan. 7, 2010

(30) Foreign Application Priority Data

Jan. 3, 2008 (EP) .................................. 08150017

(51) Int. Cl.
*G06T 15/00* (2011.01)
(52) U.S. Cl. ........................ 345/419; 715/740
(58) Field of Classification Search .................. 715/733, 715/740; 345/522, 506, 419; 709/203
See application file for complete search history.

(56) References Cited

U.S. PATENT DOCUMENTS

| | | | |
|---|---|---|---|
| 5,798,796 A | 8/1998 | Sugiyama | |
| 6,281,874 B1 | 8/2001 | Siran et al. | |
| 7,116,833 B2 | 10/2006 | Brower et al. | |
| 7,171,444 B2* | 1/2007 | Deshpande | 709/203 |
| 7,281,213 B2* | 10/2007 | Callegari | 715/733 |
| 7,430,681 B1 | 9/2008 | Hobbs | |
| 7,895,521 B2 | 2/2011 | Bhogal et al. | |
| 7,916,147 B2* | 3/2011 | Clemie et al. | 345/522 |
| 2001/0043615 A1 | 11/2001 | Park et al. | |
| 2003/0041106 A1 | 2/2003 | Tuli | |
| 2004/0064577 A1 | 4/2004 | Dahlin et al. | |
| 2005/0081158 A1* | 4/2005 | Hwang | 715/740 |
| 2005/0216859 A1 | 9/2005 | Paek et al. | |
| 2006/0176951 A1 | 8/2006 | Berman et al. | |
| 2009/0073168 A1* | 3/2009 | Jiao et al. | 345/426 |
| 2009/0096797 A1* | 4/2009 | Du et al. | 345/506 |

* cited by examiner

*Primary Examiner* — Daniel Washburn
*Assistant Examiner* — Kyle Zhai
(74) *Attorney, Agent, or Firm* — Roy W. Truelson

(57) ABSTRACT

A method, system, and program product is disclosed for remote visualization in which a server window contents is displayed remotely at a client. The client creates a 3D rendering surface on a client graphics card to display a server window contents and receives update data from the server relating to the server window contents. The update data is uploaded to the client graphics card and the graphics processing unit (GPU) is used to decode the update data and render the update data to the 3D rendering surface. The graphical processing unit includes general purpose computing on graphics processing unit functionality to provide the decoding processing.

15 Claims, 3 Drawing Sheets

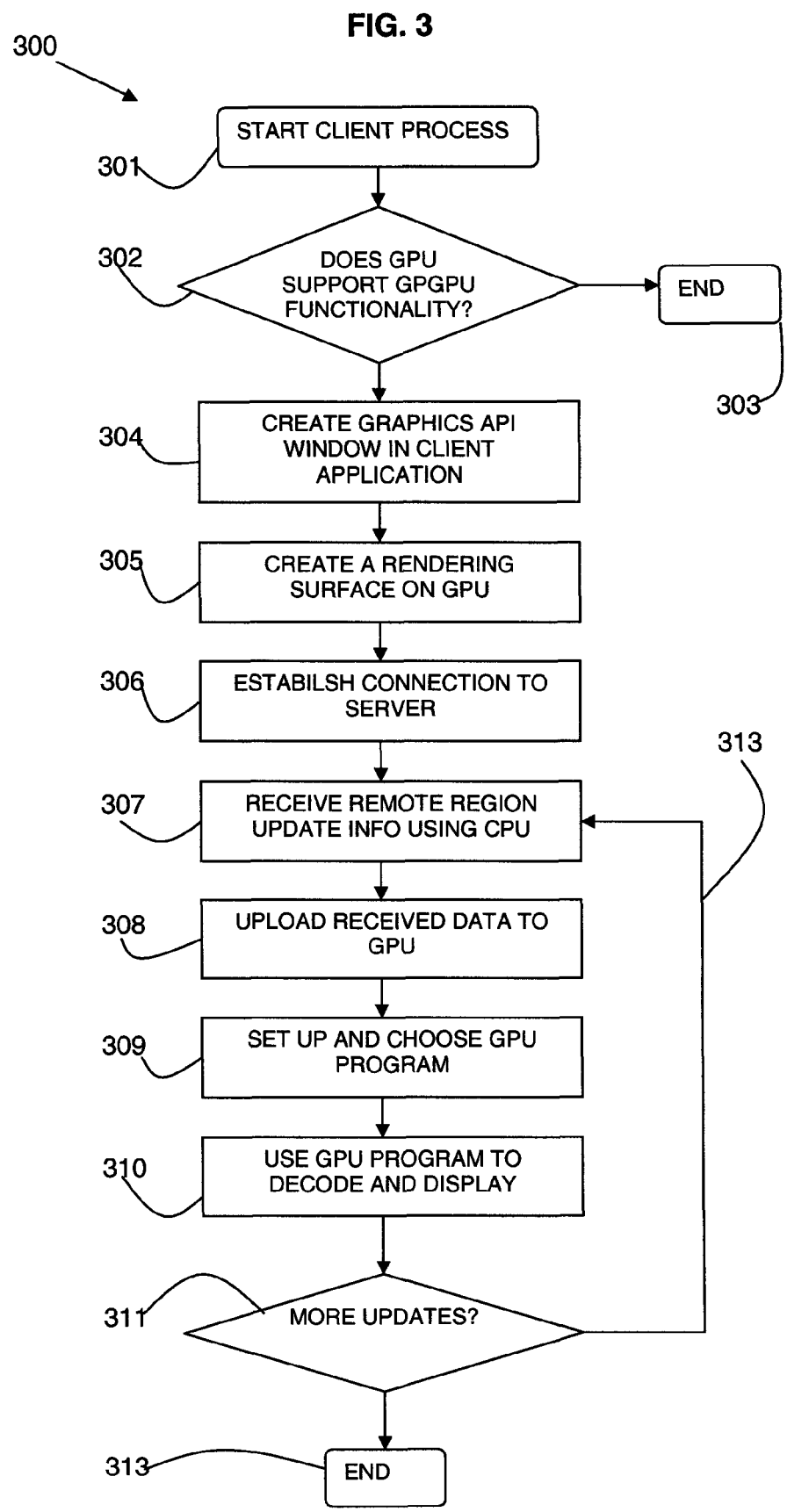

METHOD AND SYSTEM FOR REMOTE VISUALIZATION CLIENT ACCELERATION

FIELD OF THE INVENTION

This invention relates to the field of remote visualization. In particular, it relates to remote visualization client acceleration.

BACKGROUND OF THE INVENTION

Remote visualization solutions allow the users of a graphical desktop to interact with graphical applications from a remote machine or thin client.

Thin client viewers receive images over the network, which are rendered to give the end user the impression that they are using an application locally on their computer or workstation. Various implementations and algorithms are used in remote visualization applications and they normally employ image compression and they usually send only the parts of the screen that recently changed in order to optimize the bandwidth available in the network.

Remote applications such as the Open Source VNC (Virtual Network Computing) or Microsoft Remote Desktop (Microsoft is a trade mark of Microsoft Corporation in the US. and other countries) have recently been enhanced to support 3D visualization applications. These applications use graphics APIs (application programming interfaces) for 3D rendering and, due to the complexity of the rendered objects, require special hardware inside the graphics cards to accelerate 3D data processing. For example, such graphics APIs include OpenGL (Open Graphics Library) (OpenGL is a trade mark of Silicon Graphics, Inc.), and DirectX (DirectX is a trade mark of Microsoft Corporation in the US. and other countries).

OpenGL is the standard cross-platform middleware Software Development Kit (SDK) for developing 3D applications. This SDK allows the application to access, in a multi-platform and multi-vendor environment, various 3D rendering primitives and leverages any and all available hardware support and acceleration on the host system.

DirectX is the Microsoft alternative to OpenGL and allows Windows (Windows is a trade mark of Microsoft Corporation) applications to use various 3D rendering primitives and leverages any hardware support and acceleration available in the host system.

Most remote visualization enablement software works by drawing the desktop image inside the graphics card of the system server (either inside the front buffer, inside the back/memory buffer, or both) or inside a virtual frame buffer in system memory, fetching the image from the draw buffer, compressing the image (or parts of it) and finally transmitting the compressed data over the network to the client where it will be reproduced. Reproducing is the simple step of drawing the received images to specified coordinates on the client display. Mouse movements and keyboard events are relayed back from the client viewer to the server desktop providing a seamless user experience. Remote visualization applications should do all this without any noticeable application performance degradation at the client and typically this requires image updates at frame rates in or close to 25 frames per second.

The main restriction to remote visualization applications is network latency and bandwidth. Various techniques are used for compression and transmission of the images to the rendering client with the aim of reducing the required network bandwidth. These include: Sending partial images corresponding to only the changed sectors of the whole desktop between two successive frames; Using different compression schemes, i.e., JPEG (Joint Photographic Experts Group) with varying qualities, LZW (Lempel-Ziv-Welch lossless data compression algorithm); Frame dropping in which one or more frames is not sent in order to reduce network loads; Tuning encoder and decoder performance for specific CPU hardware, i.e., using performance optimizations provided through special instruction sets available in Intel (Intel is a trade mark of Intel Corporation) and other vendor CPUs (computer processing units); Manipulation of image quality, allowing the user to choose better or lower quality in a trade-off with interactive performance.

SUMMARY OF THE INVENTION

According to an embodiment of the present invention there is provided a method for remote visualization in which a server window contents is displayed remotely at a client, comprising the client carrying out a method comprising: creating a 3D rendering surface on a client graphics card to display a server window contents; receiving update data from the server relating to the server window contents; uploading the update data to the client graphics card; and using the graphics processing unit (GPU) to decode the update data and render the update data to the 3D rendering surface.

According to another embodiment of the present invention there is provided a client system for remote visualization in which a server window contents is displayed remotely at a client, including a client system comprising: a graphics card including a graphics processing unit with general purpose computing on graphics processing unit functionality; means for creating a 3D rendering surface on the client graphics card to display a server window contents; means for receiving update data from the server relating to the server window contents; means for uploading the update data to the graphics card; and the graphics processing unit including means for decoding the update data and rendering the update data to the 3D rendering surface.

According to another embodiment of the present invention there is provided a computer program product stored on a computer readable storage medium, comprising computer readable program code means causing a computer to perform a method comprising: creating a 3D rendering surface on a client graphics card to display a server window contents; receiving update data from the server relating to the server window contents; uploading the update data to the client graphics card; and using the graphics processing unit (GPU) to decode the update data and render the update data to the 3D rendering surface.

The invention applies an approach to remote visualization where use of graphics APIs and modern graphics cards' capabilities are combined to optimize costly image decompression at the remote client. This is achieved by off-loading decompression tasks to the graphic hardware GPU and then rendering the full remote desktop image inside a window rendered by the 3D graphic API. The invention applies to the full desktop including 2D and 3D parts and allows different compression schemes to be used.

BRIEF DESCRIPTION OF THE DRAWINGS

Embodiments of the present invention will now be described, by way of examples only, with reference to the accompanying drawings in which:

FIG. 3 is a flow diagram of a process in accordance with the present invention.

It is to be noted, however, that the appended drawings illustrate only example embodiments of the invention, and are therefore not considered limiting of its scope, for the invention may admit to other equally effective embodiments.

DETAILED DESCRIPTION

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
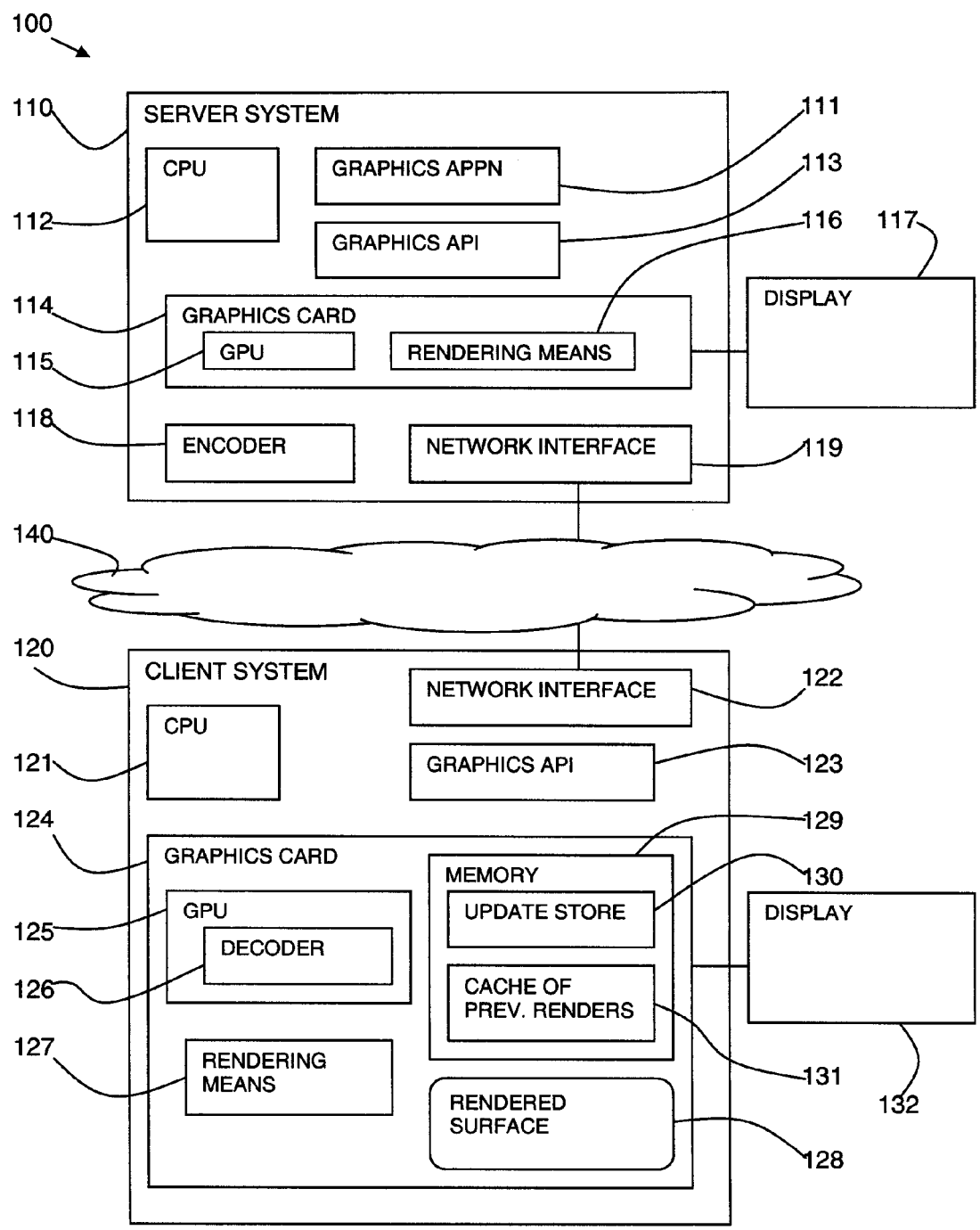
FIG. 1 is a block diagram of a system in accordance with the present invention.
Figure 2:
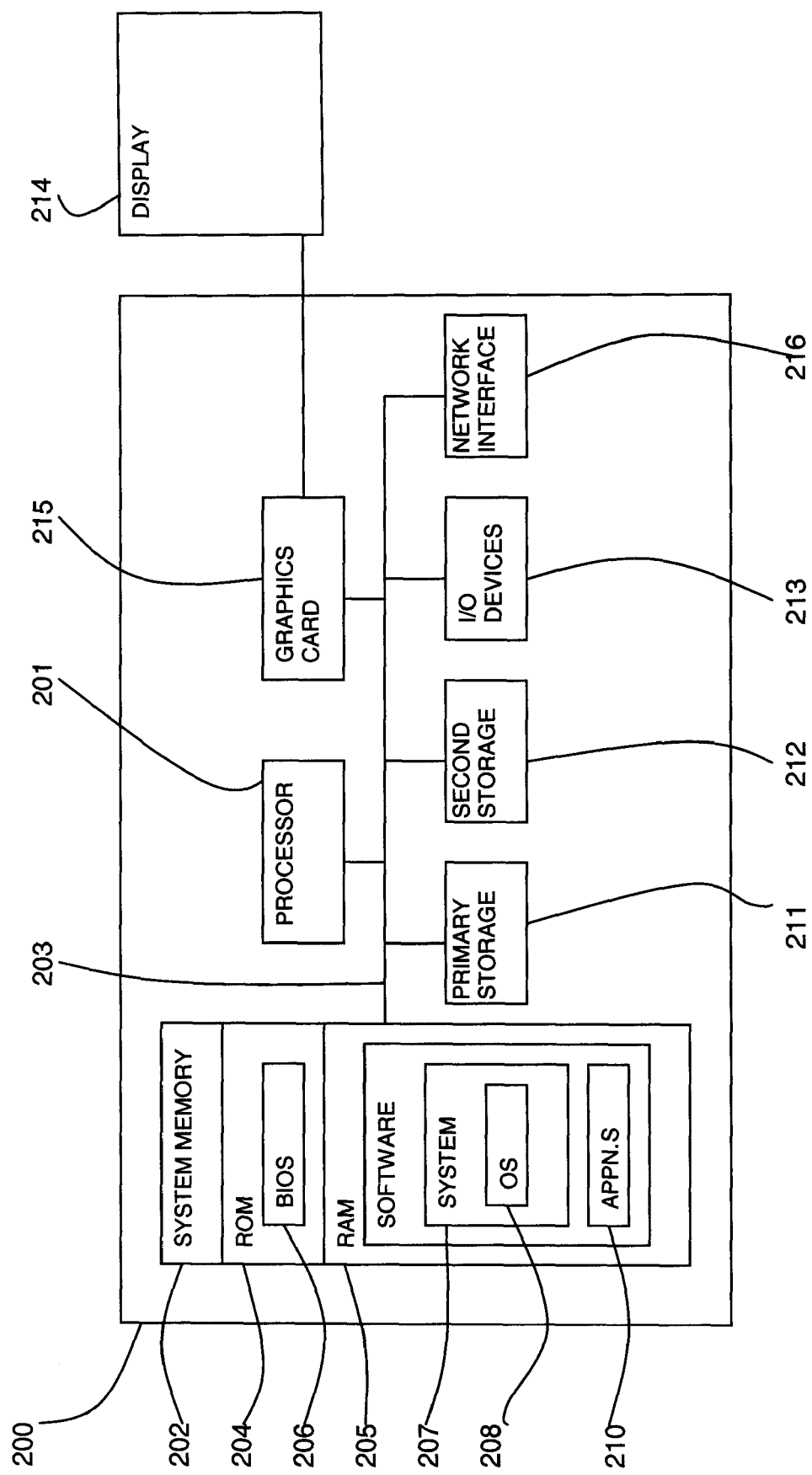
FIG. 2 is a block diagram of a computer system in which the present invention may be implemented.

Referring to FIG. 1, a system 100 is provided for remote visualization. A server system 110 is provided on which a graphics application 111 is executed. A remote client system 120 is connected to the server system 110 via a network 140 and receives graphics from the graphics application 111 of the server system 110 over the network 130 for reproducing and display at the client system 120.

The server system 110 is a data processing system and includes a CPU (central processing unit) 112 on which the graphics application 111 executes using a graphics API 113. The server system 110 also includes a graphics card 114 (also referred to as a video card, graphics accelerator card, or display adapter) which includes a GPU (graphics processing unit) 115 including means for rendering 116 the output of the graphics application 111. The server system 110 also includes a local display means 117, on which the rendered output may be displayed locally.

The server system 110 includes an encoder 118 for encoding the graphics application output updates. The encoding may include compression of the graphics application output updates, or conversion in some other form for transmission. The encoder 118 may be processed by the CPU 112 or the GPU 115 or may be partitioned among the two units. The server system 110 includes a network interface 119 for transmitting the encoded graphics application output updates to the remote client system 120 for display via the network 140.

The client system 120 is a data processing system and includes a CPU 121. The client system 120 includes a network interface 122 and a graphics API 123 for receiving the graphics application output updates from the server system 110 over the network 140.

The client system 120 includes a graphics card 124 with a GPU 125 with programming functionality. The GPU 125 may be a GPGPU (general purpose computing on graphics processing unit) processor. The GPU 125 includes a decoder 126 for decoding the encoded graphics application output updates from the server system 110. If the graphics application output updates are compressed, the decoder 126 is a decompression means. Optionally, the decoder 126 may be partitioned between the CPU 121 of the client system 120 and the GPU 125.

The graphics card 124 includes a rendering means 127 and a full screen 3D rendering surface 128 using the graphics API 123. The graphics card 124 also includes a memory 129 including an update store 130 for received updates and a cache 131 of previously rendered frames.

The client system 120 has a display 132 for display of the output from the graphics card 124 in the form of the received output from the graphics application 111 executing on the server system 120.

A further description of the steps involved in the procedure is detailed below.

The client system 120 creates a "full screen" 3D rendering surface 128 inside the graphical hardware of the graphics card 124 (using a graphics API 123 such as OpenGL or DirectX). All the rendering on the client side is performed to this surface 128. Since the underlying hardware is the same, it does not matter what method is used to create this surface 128.

A connection is established between the client system 120 and a server system 110 which is running something the client wishes to view remotely. The method of communication used is unimportant, so long as the client system 110 can receive information from the server system 110.

Updates to the display 117 on the server side are encoded and sent to the client system 120 for display on the client's display 132. The type encoding and the method chosen by the server system 110 do not matter so long as an appropriate means to decode the information exists. The programmable nature of the graphics hardware at the client system 120 allows the methods chosen to be essentially pluggable and changeable as required.

The reception of information from the server system 110 is handled by the client system's CPU 121 and hardware, which then passes the data to the graphics card 124 hardware for processing. The updates typically contain information about which region of the display to update, the size of the updated area, the method of compression used along with the actual data.

The first update from the server system 110 is likely to be the slowest as the entire server display 114 must be sent and decoded. Subsequent updates require only changes to the display 114 to be sent and processed.

The data received by the client system 120 is transferred to the graphics card 124 hardware for processing. Typically the data will be stored as in an update store 130, for example, as a texture map, in the graphics hardware which can then be accessed by the GPU 125 for processing.

The decoder 126 selects an appropriate GPU program to decode and display the server updates. The decoder 126 may upload decoder or decompression algorithms to the GPU 126. Typically, fragment programs are used for image decompression, but vertex programs may also be used, for example, to draw line data which could have been sent as a series of end-points. The pluggable nature of these programs allows new methods of transferring data from the server system 110 to the client system 120 to be used, not just traditional image compression algorithms.

Again, the API used to define these programs is irrelevant so long as the hardware supports the features and capabilities required. Thus, the programs may be low level vertex and fragment programs, or just as easily, shaders written in a high level language such as Cg (C for Graphics), HLSL (High Level Shader Language) or GLSL (OpenGL Shading Language). The decompression uses the GPU 125 for both 3D and 2D parts of the display.

The chosen GPU program processes the region updates provided by the server system 110 and outputs the results to the 3D rendering surface 128 where they are displayed. Results from previous renders may be cached in a cache 131 and reused in subsequent updates. In such a case, only the relevant motion detail need be sent by the server system 110, thus allowing a window to overlay others and be moved without requiring a full update from the server system 110 for the underlying data.

The final image is displayed on the client display 132 utilising the combination of previous frame displays plus any recent updates. The use of the GPU 125 to control the rendering and the use of pluggable means of image decoding frees the client system CPU 121 resources for other tasks.

All client side rendering of the remote visualization application occurs within a single window 128. In one embodiment, the window is an OpenGL window. Within this OpenGL context, a single 2D plane will be created upon which received 2D images, received from the server system 110, will be rendered. Decoding or decompression of the received images will also be passed through to the GPU 125 resulting in nearly all of the remote visualization's client processing occurring with the GPU 125. This allows a remote client system 120 to make use of the maximum hardware resources available to it to accelerate the tasks of remote visualization and allow optimum resource availability to the running applications of the client system 120.

The programmable nature of modern GPUs allow them to serve as a parallel processor to the main CPU(s) and due to their hardware design, they are uniquely suited to performing image processing.

By utilizing the programmable hardware capabilities of the GPU, the encoding might not be just compressed image fragments, but can include encoded drawing commands. For example, an area fill operation can be encoded as a binary command with the following operands: position and size on screen, pixel colour. An appropriate GPU program can be selected to directly draw the rectangular area with the specified colour, instead of forcing the server to compress an image of a uniform coloured rectangle. This allows further bandwidth savings.

Referring to FIG. 2, an exemplary system for implementing the server system 110 and client system 120 is described. The systems 110, 120 are both of the form of a data processing system 200 suitable for storing and/or executing program code including at least one central processing unit 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including OS software 208. Software applications 210 may also be stored in RAM 205.

The data processing system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 operates in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joystick, game pad, satellite dish, scanner, or the like). Output devices may include speakers, printers, etc.

A display device 214 is also connected to system bus 203 via a graphics card 215. Referring to FIG. 3, the procedure for remote visualization operations on the viewer are described with reference to a flow diagram 300.

A client application is started 301 and tests 302 that the GPU supports GPGPU functionality. If it does not support GPGPU functionality, the process ends 303. If it does support GPGPU functionality the process proceeds.

In the client application a graphics API window is created 304. A 3D rendering surface is created 305 on the GPU to display the remote desktop contents.

A connection is established 306 via some network to a server hosting an application.

Remote region update information is received 307 from the server via the network using the client system's CPU. Each region update typically contains coordinates, size of the region, and the encoded data.

The received update data is uploaded 308 to the GPU hardware, typically as a texture map. An appropriate GPU program is set up and chosen 309 to process the data for output. The program is used 310 to decode the data and display on the 3D rendering surface. Existing display content plus any received updates make up the final image displayed on the client.

It is determined 311 if there are more updates being received, and if so, the process loops 312 to receive remote region update information using the system CPU 307. If there are no further updates, the process ends 313.

Programmable GPUs allow multiple independent encoding or compression methods to be used for each update as appropriate. For example, predominantly 2D information that is seldom updated may be compressed via a loss-less method, while rapidly changing images or 3D image data from the server might be compressed via an aggressive lossy algorithm.

Since all images are to be drawn on a 2D plane in a 3D space, varying the sizes of images may be layered to produce the final image. This allows for efficient transport of "delta" images from the server.

With the client using the GPU resources at its disposal to decode and display updates passed form the server, the client's system CPU resources are freed for other tasks. This technique is independent of the graphical API used (i.e., OpenGL, DirectX, etc.)

It can be used for either full or partial screen remote rendering, i.e., only remote 3D content or remote 3D and 2D content.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for remote visualization in which a server window contents is displayed remotely at a client, comprising the client carrying out the method comprising:
    creating a 3D rendering surface on a client graphics accelerator device to display a server window contents on said client, said server window contents being generated by a 3D graphics application executing on a server, the server being in communication with said client over a network, said client comprising a system memory, at least one central processing unit (CPU) for executing program instructions storable in the system memory, and said client graphics accelerator device, the client graphics accelerator device including a graphics processing unit (GPU) with programming functionality;
    receiving, via said network from said server, a plurality of server window contents updates, each update containing encoded data specifying a respective change to a respective portion of the server window contents generated by said 3D graphics application, the respective portion being less than the entire server window, wherein at least some of said plurality of server window updates comprise a respective compressed image fragment of the respective portion of the server window contents, and wherein at least some of said plurality of server window updates comprise at least one respective encoded drawing command of the respective portion of the server window contents without containing a respective compressed image fragment;
    uploading the encoded data in each said server window contents update to the client graphics accelerator device;
    for each said server window contents update, independently selecting a respective GPU program from among a plurality of available GPU programs for decoding the encoded data in the respective server window contents update, wherein a plurality of different GPU programs are independently selected for decoding respective encoded data representing respective updates to said server window contents;
    using said graphics processing unit (GPU) to decode the encoded data in each said server window content update by executing on the GPU the corresponding GPU program selected by said selecting a respective GPU program from among a plurality of available GPU programs; and
    rendering the decoded data from each server window content update to the 3D rendering surface.

2. The method of claim 1, wherein receiving, via said network from said server, a plurality of server window updates, utilizes the at least one central processing unit (CPU) in said client, and wherein uploading the encoded data in each said server window contents update to the client graphics accelerator device utilizes the at least one central processing unit (CPU) in said client.

3. The method of claim 1, wherein each of the server window updates comprises respective: coordinates of the region of update; a size of the update, a method of encoding, and encoded data.

4. The method of claim 1, wherein the method of encoding is a compression algorithm or a conversion of the data.

5. The method of claim 1 further comprising:
    caching the results of previous renders of the 3D rendering surface;
    using the results of previous renders in subsequent updates to the 3D rendering surface.

6. The method of claim 5 further comprising:
    displaying at the client a combination of previous frames of the 3D rendering surface and recent updates.

7. The method of claim 1, wherein the update data is stored in a texture map at the client graphics accelerator device and accessed for processing by the graphics processing unit.

8. The method of claim 1, wherein the graphics processing unit supports plug-in programs for decoding update data in the form of one of a fragment program, a vertex program, or a shader program.

9. A non-transitory computer readable medium bearing a computer program product loadable into the internal memory of a digital computer, comprising software code portions that causes a computer, when said product is run on the computer, to perform a method comprising:
    creating a 3D rendering surface on a client graphics accelerator device to display a server window contents on said client, said server window contents being generated by a 3D graphics application executing on a server, the server being in communication with said client over a network, said client comprising a system memory, at least one central processing unit (CPU) for executing program instructions storable in the system memory, and said client graphics accelerator device, the client graphics accelerator device including a graphics processing unit (GPU) with programming functionality;
    receiving, via said network from said server, a plurality of server window contents updates, each update containing encoded data specifying a respective change to a respective portion of the server window contents generated by said 3D graphics application, the respective portion being less than the entire server window, wherein at least some of said plurality of server window updates comprise a respective compressed image fragment of the respective portion of the server window contents, and wherein at least some of said plurality of server window updates comprise at least one respective encoded drawing command of the respective portion of the server window contents without containing a respective compressed image fragment;

uploading the encoded data in each said server window contents update to the client graphics accelerator device;

for each said server window contents update, independently selecting a respective GPU program from among a plurality of available GPU programs for decoding the encoded data in the respective server window contents update, wherein a plurality of different GPU programs are independently selected for decoding respective encoded data representing respective updates to said server window contents;

using said graphics processing unit (GPU) to decode the encoded data in each said server window content update by executing on the GPU the corresponding GPU program selected by said selecting a respective GPU program from among a plurality of available GPU programs; and rendering the decoded data from each server window content update to the 3D rendering surface.

10. A client system for remote visualization of server window contents, comprising:

a system memory;

at least one central processing unit (CPU) for executing program instructions storable in said system memory;

a graphics accelerator device comprising a graphics processing unit (GPU) with programming functionality, said graphics accelerator device including a decoder and a rendering function;

a network interface for communication with a server over a network; and a graphics function executable on the at least one central processing unit, said graphics function generating a 3D rendering surface on said graphics accelerator device to display server window contents on said client, said server window contents being generated by a 3D graphics application executing on said server, said graphics function further uploading respective encoded data specifying a respective change to a respective portion of the server window contents generated by said 3D graphics application contained in each of a plurality of server window contents updates to said graphics accelerator device, the respective portion being less than the entire server window, wherein at least some of said plurality of server window contents updates comprise a respective compressed image fragment of the respective portion of the server window contents, and wherein at least some of said plurality of server window contents updates comprise at least one respective encoded drawing command of the respective portion of the server window contents without containing a respective compressed image fragment;

wherein said decoder independently selects, for each said server window contents update, a respective GPU program from among a plurality of available GPU programs for decoding the encoded data in the respective server window contents update, and executes the selected GPU program in the graphics processing unit to decode the encoded data, wherein a plurality of different GPU programs are independently selected and executed for decoding respective encoded data representing respective updates to said server window contents;

wherein the rendering function renders the decoded data from each server window content update to the 3D rendering surface.

11. The system of claim 10, wherein each said server window content update comprises respective: coordinates of the region of update, a size of the update, a method of encoding, and encoded data.

12. The system of claim 10, wherein said graphics accelerator device further comprises a cache for caching the results of previous renders of the 3D rendering surface;

wherein the graphics processing unit uses the results of previous renders in subsequent updates to the 3D rendering surface.

13. The system of claim 12, wherein the graphics accelerator device displays on a display of the client a combination of previous frames of the 3D rendering surface and recent updates.

14. The system of claim 10, further comprising: a texture map in which update data is stored at the client graphics card and accessed for processing by the graphics processing unit.

15. The system of claim 10, wherein the GPU program used to decode the update data includes one of a fragment program, a vertex program, or a shader program.

* * * * *